United States Patent
Hasegawa et al.

(10) Patent No.: US 10,248,352 B2
(45) Date of Patent: Apr. 2, 2019

(54) MANAGEMENT OF OBJECT LOCATION IN HIERARCHICAL STORAGE

(71) Applicant: International Business Machines Corporation, Armonk, NY (US)

(72) Inventors: Tohru Hasegawa, Tokyo (JP); Hiroshi Itagaki, Yokohama (JP); Sosuke Matsui, Machida (JP); Shinsuke Mitsuma, Higashimurayama (JP); Tsuyoshi Miyamura, Yokohama (JP); Noriko Yamamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 15/267,032

(22) Filed: Sep. 15, 2016

(65) Prior Publication Data
US 2018/0074747 A1 Mar. 15, 2018

(51) Int. Cl.
*G06F 3/06* (2006.01)

(52) U.S. Cl.
CPC .......... *G06F 3/0644* (2013.01); *G06F 3/0604* (2013.01); *G06F 3/067* (2013.01);
(Continued)

(58) Field of Classification Search
CPC ... G06F 3/00–3/0482; G06F 3/0483–3/04883; G06F 3/04886–3/0604;
(Continued)

(56) References Cited

U.S. PATENT DOCUMENTS

| 6,269,382 B1* | 7/2001 | Cabrera ............ G06F 17/30082 |
| 8,548,965 B2* | 10/2013 | Devarakonda .... G06F 17/30091 707/695 |

(Continued)

FOREIGN PATENT DOCUMENTS

| JP | 2013025341 A | 2/2013 |
| JP | 2013507668 A | 3/2013 |

(Continued)

OTHER PUBLICATIONS

Definition of cloud computing; Beal, Vangie; Jun. 1, 2014; retrieved from https://www.webopedia.com/quick_ref/cloud_computing.asp on Mar. 17, 2018 (3 pages) (Year: 2014).*

(Continued)

*Primary Examiner* — Daniel C Chappell
(74) *Attorney, Agent, or Firm* — Zilka-Kotab, P.C.

(57) ABSTRACT

There is disclosed a method performed by a computer system for managing a location of an object in a hierarchical storage that includes a plurality of storage layers. In the method, the computer system receives a selection of one storage layer for storing a selected object from among the plurality of the storage layers via a network connected to the computer system. The computer system also moves the selected object to the one storage layer from other storage layer currently that stores the selected object among the plurality of the storage layers. The computer system further excludes the selected object from targets of a predetermined space management that is being applied to objects in the hierarchical storage.

20 Claims, 8 Drawing Sheets

(52) U.S. Cl.
CPC .......... *G06F 3/0631* (2013.01); *G06F 3/0647* (2013.01); *G06F 3/0685* (2013.01)

(58) Field of Classification Search
CPC . G06F 3/0605–3/0629; G06F 3/0631–3/0644; G06F 3/0646–3/0647; G06F 3/0649–3/067; G06F 3/0671–3/0689; G06F 11/00–11/3696; G06F 12/00–12/16; G06F 17/00–17/30997; G06F 2003/0691–2003/0698; G06F 2203/00–2203/04809; G06F 2206/00–2206/20; G06F 2211/00–2211/902; G06F 2212/00–2212/7211; G06F 2213/00–2213/40; G06F 2216/00–2216/17
See application file for complete search history.

(56) References Cited

U.S. PATENT DOCUMENTS

| | | | |
|---|---|---|---|
| 9,021,204 | B1 | 4/2015 | Awasthi et al. |
| 9,858,278 | B2* | 1/2018 | Iwasaki ............ G06F 17/30082 |
| 2005/0097126 | A1* | 5/2005 | Cabrera ............ G06F 17/30067 |
| 2007/0055715 | A1* | 3/2007 | Achiwa ............ G06F 17/30079 |
| 2010/0030791 | A1 | 2/2010 | Iverson et al. |
| 2011/0276753 | A1* | 11/2011 | Peake ................ G06F 3/0611 711/111 |
| 2012/0066337 | A1 | 3/2012 | Wu et al. |
| 2012/0158882 | A1* | 6/2012 | Oehme ................ G06F 19/321 709/213 |
| 2012/0173833 | A1* | 7/2012 | Lehr ........................ G06F 3/061 711/165 |
| 2014/0351515 | A1 | 11/2014 | Chiu et al. |
| 2016/0063007 | A1* | 3/2016 | Iwasaki ............ G06F 17/30079 707/645 |

FOREIGN PATENT DOCUMENTS

| | | |
|---|---|---|
| JP | 2013533991 A | 8/2013 |
| JP | 2014203141 A | 10/2014 |

OTHER PUBLICATIONS

TripS: automated multi-tiered data placement in a geo-distributed cloud environment; Oh et al.; Proceedings of the 10th ACM International Systems and Storage Conference, Article No. 12; May 22-24, 2017 (Year: 2017).*

Tiera: towards flexible multi-tiered cloud storage instances; Raghavan et al.; Proceedings of the 15th International Middleware Conference, pp. 1-12; Dec. 8-12, 2014 (Year: 2014).*

An architecture for lifecycle management in very large file systems; Verma et al.; 22nd IEEE / 13th NASA Goddard Conference on Mass Storage Systems and Technologies; Apr. 11-14, 2005 (Year: 2005).*

Policy-based information lifecycle management in a large-scale file system; Beigi et al.; Sixth IEEE International Workshop on Policies for Distributed Systems and Networks; Jun. 6-8, 2005 (Year: 2005).*

* cited by examiner

/TEST/:

📁 MOVE TO PARENT DIRECTORY

| NAME | SIZE | LAST UPDATE |
|---|---|---|
| 📄 document01.txt | 6 kB | 20xx/xx/xx xx:xx:xx |
| 📄 document01_revice1.txt | 5 kB | 20xx/xx/xx xx:xx:xx |
| 📄 document01_revice2.txt | 5 kB | 20xx/xx/xx xx:xx:xx |
| 📄 document01_revice3.txt | 5 kB | 20xx/xx/xx xx:xx:xx |
| 📄 document02.txt | 13 kB | 20xx/xx/xx xx:xx:xx |
| 📄 document02_revice1.txt | 11 kB | 20xx/xx/xx xx:xx:xx |
| 📄 document02_revice2.txt | 11 kB | 20xx/xx/xx xx:xx:xx |
| 📄 document02_revice3.txt | 12 kB | 20xx/xx/xx xx:xx:xx |

/TEST/:

📁 MOVE TO PARENT DIRECTORY

| NAME | SIZE | LAST UPDATE |
|---|---|---|
| 📄 document01.txt | 6 kB | 20xx/xx/xx xx:xx:xx |
| 📄 document01_revice1.txt | 5 kB | 20xx/xx/xx xx:xx:xx |
| 📄 document01_revice2.txt | 5 kB | 20xx/xx/xx xx:xx:xx |
| 📄 document01_revice3.txt | 5 kB | 20xx/xx/xx xx:xx:xx |
| 📄 document02.txt | 13 kB | 20xx/xx/xx xx:xx:xx |
| 📄 document02_revice1.txt | 11 kB | 20xx/xx/xx xx:xx:xx |
| 📄 document02_revice2.txt | 11 kB | 20xx/xx/xx xx:xx:xx |
| 📄 FLICK ➡ revice3.txt | 12 kB | 20xx/xx/xx xx:xx:xx |

FIG. 3B

/TEST/:

📁 MOVE TO PARENT DIRECTORY

| NAME | SIZE | LAST UPDATE |
|---|---|---|
| document01.txt | 6 kB | 20xx/xx/xx xx:xx:xx |
| document01_revice1.txt | 5 kB | 20xx/xx/xx xx:xx:xx |
| document01_revice2.txt | 5 kB | 20xx/xx/xx xx:xx:xx |
| document01_revice3.txt | 5 kB | 20xx/xx/xx xx:xx:xx |
| document02.txt | 13 kB | 20xx/xx/xx xx:xx:xx |
| document02_revice1.txt | 11 kB | 20xx/xx/xx xx:xx:xx |
| document02_revice2.txt | 11 kB | 20xx/xx/xx xx:xx:xx |
| document02_revice3.txt | 12 kB | 20xx/xx/xx xx:xx:xx |

/TEST/:

📁 MOVE TO PARENT DIRECTORY

| NAME | SIZE | LAST UPDATE |
|---|---|---|
| document01.txt | 6 kB | 20xx/xx/xx xx:xx:xx |
| document01_revice1.txt | 5 kB | 20xx/xx/xx xx:xx:xx |
| document01_revice2.txt | 5 kB | 20xx/xx/xx xx:xx:xx |
| document01_revice3.txt | 5 kB | 20xx/xx/xx xx:xx:xx |
| document02.txt | 13 kB | 20xx/xx/xx xx:xx:xx |
| document02_revice1.txt | 11 kB | 20xx/xx/xx xx:xx:xx |
| document02_revice2.txt | 11 kB | 20xx/xx/xx xx:xx:xx |
| FLICK ⇒ 02_revice3.txt | 12 kB | 20xx/xx/xx xx:xx:xx |

FIG. 5B

MANAGEMENT OF OBJECT LOCATION IN HIERARCHICAL STORAGE

BACKGROUND

The present invention, generally, relates to hierarchical storage, more particularly, to management of a location for storing an object in the hierarchical storage.

Cloud service providers often offer different rate plans depending on performance of their services provided. In cloud storage systems, various types of storage devices can be used as backend of the systems for retaining user data. High speed disk storages can be used to improve access performance low cost tape storage can be also available to reduce cost of the service if users make little account of performance and latency.

Hierarchical storage systems that integrate different types of storage devices including typically high-speed disk storages and low-cost tape storages have been known. In such system, hierarchical storage management (HSM) functionality may actively move user data among the storage devices while making it transparent to a user. Active data that is frequently accessed is stored in the high-speed disk storage. On the other hand, inactive data that is not accessed for a certain period of time is migrated to the low cost tape storage.

By using the hierarchical storage system for the cloud storage service, the cloud service providers can provide their services economically while keeping a certain level of service performance. In such system, physical locations of objects such as files in the hierarchical storage may be controlled by the system. End users could not control object locations in the hierarchical storage.

There is still a need for improved hierarchical storage techniques for handling objects among a plurality of storage layers in a hierarchical storage.

SUMMARY

According to an embodiment of the present invention there is provided a method performed by a computer system for managing a location of an object in a hierarchical storage that includes a plurality of storage layers. The method includes receiving a selection of one storage layer for storing a selected object from among the plurality of the storage layers via a network that is connected to the computer system. The method also includes moving the selected object to the one storage layer from other storage layer currently storing the selected object among the plurality of the storage layers. The method further includes excluding the selected object from targets of a predetermined space management that is being applied to objects in the hierarchical storage.

According to another embodiment of the present invention there is provided a method performed by a computer system for providing control of a location of an object in a hierarchical storage to a terminal device via a network. The hierarchical storage includes a plurality of storage layers. The method comprises providing a graphical user interface to the terminal device through a communication via the network. The graphical user interface is configured to invoke a selection of one storage layer for storing a selected object from among the plurality of the storage layers in response to an event on the terminal device. The method also comprises, in response to the selection, moving the selected object to the one storage layer from other storage layer currently storing the selected object among the plurality of the storage layers. The method further includes reflecting change of a corresponding storage layer storing the selected object in the graphical user interface as a result of the selection through a communication via the network.

Computer systems and computer program products relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The forgoing and other features and advantages of the invention are apparent from the following detailed description taken in conjunction with the accompanying drawings in which:

FIG. 3A depicts an example of a graphical user interface for displaying a list of objects and selecting a physical location of a selected object according to the exemplary embodiment of the present invention;

FIG. 3B describes a user gesture operation to select a physical location of the selected object according to the exemplary embodiment of the present invention;

FIG. 5A depicts change in a graphical user interface as a result of the selection of the physical location for the selected object according to the exemplary embodiment of the present invention;

FIG. 5B describes a user gesture operation to release the selection of the physical location for the selected object according to the exemplary embodiment of the present invention;

DETAILED DESCRIPTION

Now, the present invention will be described using particular embodiments, and the embodiments described hereafter are understood to be only referred as examples and are not intended to limit the scope of the present invention.

One or more embodiments according to the present invention are directed to methods, computer systems and computer program products for managing a location of an object in a hierarchical storage and/or providing a control of the location of the object in the hierarchical storage to a terminal device.

Now, referring to FIG. 1, it will be described a cloud storage system for managing a physical location of a file in a hierarchical storage and/or providing a control of the physical location of the file in the hierarchical storage to a client device according to an exemplary embodiment of the present invention.

Figure 1:
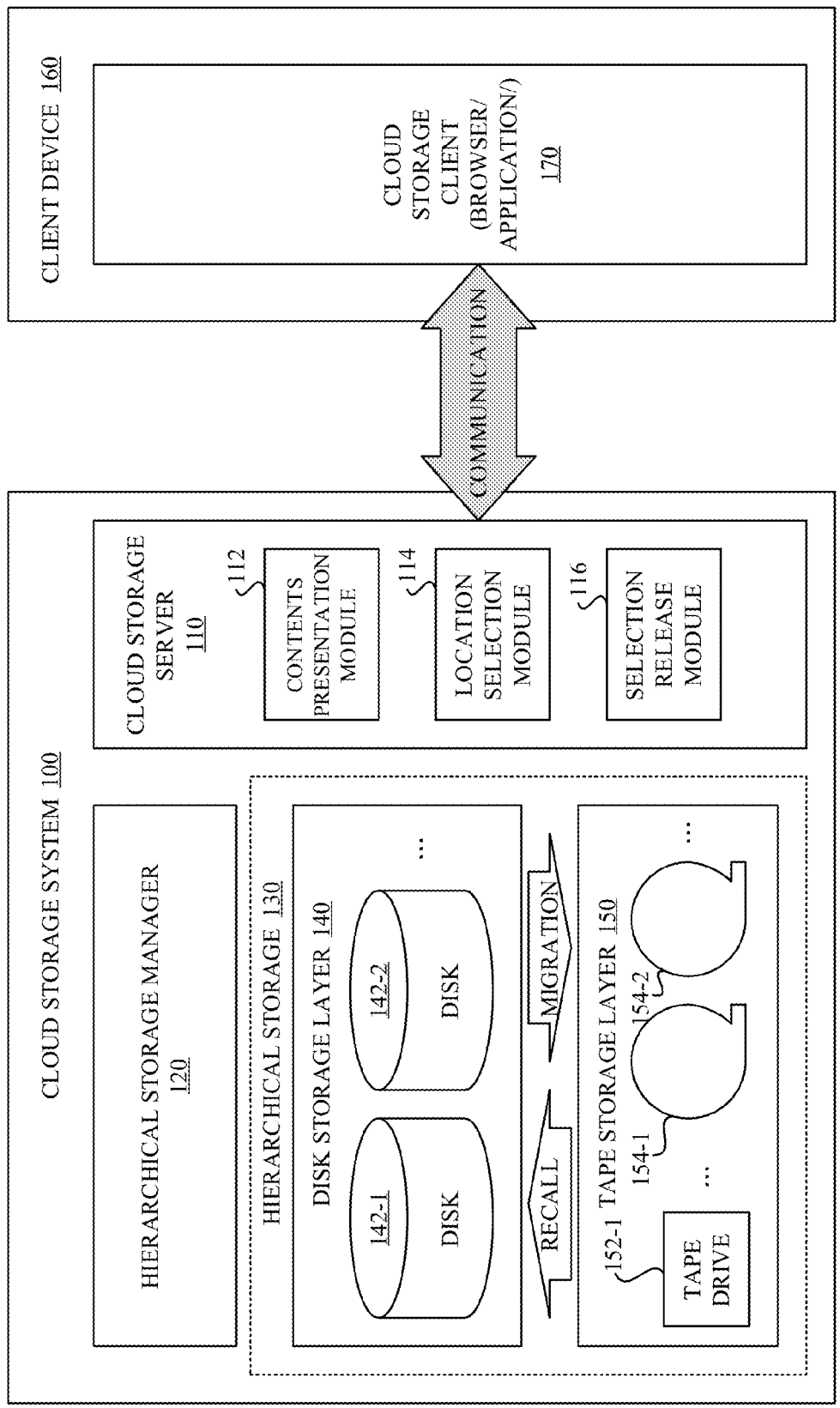
FIG. 1 illustrates a block diagram of a cloud storage system according to an exemplary embodiment of the present invention.

FIG. 1 illustrates a block diagram of a cloud storage system 100 according to the exemplary embodiment of the present invention. As shown in FIG. 1, a client device 160 that may be in communication with the cloud storage system 100 via a network is also described. The network may be any kind of known network, which may include a local area network, a wide area network, a public network such as internet, etc.

As shown in FIG. 1, the cloud storage system 100 may include a cloud storage server 110, a hierarchical storage manager 120, and a hierarchical storage 130 including a disk storage layer 140 and a tape storage layer 150. The client device 160 may include a cloud storage client 170.

The cloud storage server 110 may be a server that provides a cloud storage service to external terminal devices including the client device 160 through a communication via the network. The cloud storage service may be a service designed to host user data, which may allow users to upload files and to access the uploaded files over the network. The cloud storage client 170 may be a browser or an application that receives the cloud storage service through the communication via the network.

In a particular embodiment, the cloud storage server 110 may include a front end that exports APIs (Application Programming Interfaces) to access the cloud storage, which may include Web service based APIs, file based APIs, block based APIs, etc. The cloud storage client 170 may be a web browser, or a mobile or desktop application that can access to the cloud storage server 110 through the APIs.

The cloud storage server 110 may provide several file management functionalities to the cloud storage client 170. Such file management functionality may include user registration, user login, adding a directory, deleting a directory, uploading a file, downloading a file, deleting a file, renaming a file, selecting a physical location of a file, releasing a selection of location for a file, etc.

The hierarchical storage 130 may include a plurality of storage layers with different types of storage mechanisms, each of which may provide resources for storing the user data. In the describing embodiment, the hierarchical storage 130 may include the disk storage layer 140 and the tape storage layer 150. The hierarchical storage 130 may be used as backend of the cloud storage service.

The disk storage layer 140 may include one or more disks 142, each of which may be, but not limited to, a magnetic hard disk drive. Each disk 142 may be connected to one or more nodes in the cloud storage system 100 via a SAN (Storage Area Network) fabric, which may include, but not limited to, FC (Fibre Channel)—SAN and/or IP (Internet Protocol)—SAN.

The tape storage layer 150 may include one or more tape drives 152 and one or more tape media 154. Each tape drive 152 may be connected to the one or more nodes in the cloud storage system 100 via SAN fabric, FC LVD (Low Voltage Differential) SCSI (Small Computer System Interface) or SAS (Serial Attached SCSI) cables. A tape library including a plurality of the tape drives 152 may be provided in the tape storage layer 150 to enable multiple nodes of the cloud storage system 100 to access a set of the tape media 154 simultaneously. The tape media 154 may be inserted into the tape drive 152, which may accept LTO (Linear Tape-Open) Ultrium cartridges, or other open or proprietary tape cartridges.

The hierarchical storage manager 120 may be a software that provides integration of the disk storage layer 140 with the tape storage layer 150. The hierarchical storage manager 120 may perform a space management that includes automatic migration and recall activities of user files among the plurality of the storage layers 140, 150 in the hierarchical storage 130.

The migration is a process in which files are moved from the disk 142 of the disk storage layer 140 to the tape media 154 of the tape storage layer 150, which leaves behind a small stub file on the disk 142. The recall is a process in which the migrated files are moved from the tape media 154 of the tape storage layer 150 back to the disk 142 of the disk storage layer 140.

In a particular embodiment, a file newly added to or a file overwritten may initially be only on the disk storage layer 140, thus the file state is initially "resident". If the file is migrated to the tape storage layer 150 by the migration, the file state may become "migrated". The migrated file may be recalled from the tape storage layer 150 by the recall. The file state in which file is both on the disk and tape storage layers 140, 150 is referred to as "pre-migrated".

The hierarchical storage manager 120 may migrate a file from the disk storage layer 140 to the tape storage layer 150 and recall the migrated file back to the disk storage layer 140 when the migrated file is accessed. The space management may be performed based on a predetermined policy, which may be designed at a side of the cloud storage system 100.

In the describing embodiment, the hierarchical storage 130 is described to have the disk storage layer 140 and the tape storage layer 150 and the hierarchical storage manager 120 is described to perform the space management among the disk and tape storage layers 140, 150. However, configuration of the hierarchical storage 130 may not be limited to the specific embodiment shown in FIG. 1. In one or more embodiments, the hierarchical storage 130 may generally include two or more storage layers and the hierarchical storage manager 120 may perform the space management among the two or more storage layers, each of which may be a flash storage layer, an online disk storage layer (e.g., RAID), a near-line disk storage layer (e.g. SATA), a tape storage layer to name but a few.

Further referring to FIG. 1, detail of the cloud storage server 110 is also shown. The cloud storage server 110 may include a content presentation module 112 for presenting contents in a designated directory; a location selection module 114 for selecting a physical location for a selected file or directory; and a selection release module 116 for releasing the selection of the physical location for a selected file or directory.

At First, detailed of the content presentation module 112 is described below. The content presentation module 112 may be configured to present contents of the designated directory to the client device 160. The contents of the designated directory may include a list of objects and information describing a storage layer where each object is physically stored. Note that the object may be a file or (sub) directory. Hereinafter, with respect to a certain object, the storage layer where the certain object is physically stored is referred to as a "corresponding storage layer".

In the describing embodiment, the content presentation module 112 may be configured to provide a graphical user interface to the client device 160 through a communication via the network. The graphical user interface may be displayed on a display device of the client device 160 by the cloud storage client 170. The graphical user interface may be configured to show a view of the objects in the designated directory on a screen of the cloud storage client 170.

In the describing embodiment, the corresponding storage layer for the object may be expressed by using an indent, a color (red, blue, etc.), a size (1, 2, 3 etc.), a font (Times New Roman, Arial, Century, etc.) and/or emphasis (bold, italic, etc.) of a text such as a file name, a file size, a last update timestamp, etc. in the view of the objects. Alternatively or additionally, the corresponding storage layer for the object may be expressed by using position, color and/or picture of a pictogram such as an icon in the view of the objects. Alternatively or additionally, a text indicating the corresponding storage layer for the object may be added as an item in the list likely to name, size and last update timestamp. Thus, objects stored on the disk storage layer 140 can be distinguished visually from objects that are stored on the tape storage layer 150.

In the describing embodiment, providing of the graphical user interface to the client device 160 may include a variety of forms. In a particular embodiment where the cloud storage client 170 is a web browser, the cloud storage server 110 may transmit a web content defining the graphical user interface to the cloud storage client 170. In other particular embodiment, the cloud storage server 110 may transmit merely data such as the list of the objects to the cloud storage client 170. In the other particular embodiment, the graphical user interface may be completed by complementing client-side code defining the graphical user interface with the transmitted data.

Next, detailed of the location selection module 114 is described below. The location selection module 114 may be configured to receive from the client device 160 a selection of one storage layer for a selected object as a physical location for storing the selected object. The location selection module 114 may be configured to notify a corresponding storage layer that newly stores the selected object to the client device 160 as a response to the selection so as to reflect change of the corresponding storage layer in the graphical user interface.

The graphical user interface provided by the content presentation module 112 may also be configured to invoke a request of selection for a target object in response to an event occurred at the view of the objects. The event may be triggered by a user operation via an input device of the client device 160, which may be dragging, swiping or flicking of a graphical object (a text and/or a pictogram) representing the target object in a predetermined manner. For example, when user flicks a name of certain file from side to side on the screen, the request of the selection that specifies one storage layer (disk or tape) from among the plurality of the storage layers 140, 150 for the file may be invoked depending on the direction of the flicking.

Upon receiving the request of the selection, the location selection module 114 may move the selected object to the one storage layer from other storage layer that currently stores the selected object in cooperation with the hierarchical storage manager 120.

The location selection module 114 may request the hierarchical storage manager 120 to migrate a file that is selected to be stored on the tape from the disk storage layer 140 to the tape storage layer 150. The location selection module 114 may request the hierarchical storage manager 120 to recall a file that is selected to be stored on the disk back to the disk storage layer 140 from the tape storage layer 150.

The location selection module 114 may be further configured to exclude the selected object from targets of the space management that is being applied to the objects in the hierarchical storage 130 by the hierarchical storage manager 120.

In a particular embodiment, the location selection module 114 may set a first value (an exclusion flag is "ON") in an extended attribute of the selected object to exclude the selected object from the targets of the space management. The first value may indicate that the selected object is explicitly excluded from the targets of the space management by the user. The aforementioned policy for the space management may include a condition for the extended attribute of each object. When the user explicitly selects the physical location of the file, the file would not be moved owing to the space management even if the file matches the predetermined policy since the file is excluded from the targets.

The extended attribute of the file may be defined and stored as metadata in a file or a stub file on the disk 142. Note that the stub file may be a file left on the disk storage layer 140 when the hierarchical storage manager 120 migrates the substantive data of the file to the tape storage layer 150, which may use minimal space but hold all metadata.

Finally, detailed of the selection release module 116 is described below. The selection release module 116 may be configured to receive from the client device 160 a request for releasing the selection of the physical location for a selected object, release the selection requested and notify that the selection for the selected object has been released to the client device 160 as a response to the request.

The graphical user interface may be configured to invoke the release request in response to an event occurred at the view of the objects. The event may be triggered by a user operation via the input device of the client device 160, which may be dragging, swiping or flicking of a graphical object (text and/or pictogram) representing a target object in a predetermined manner that is different from the selection. For example, when the user flicks a name of certain file outwardly in the view of the object, the release request for the file may be invoked.

In response to receiving the release request from the client device 160, the selection release module 116 may incorporate the selected object into the targets of the aforementioned space management again.

In a particular embodiment, the selection release module 116 may set a second value (the exclusion flag is "OFF") in the extended attribute of the selected object to incorporate the selected object again. The second value may indicate that the selected object is incorporated to the targets of the space management as a default or explicitly by the user. When the user explicitly releases the selection for the file, the file would be moved by the space management at appropriate timing if the file matches the predetermined policy since the file is incorporated into the targets.

In one or more embodiments, each of modules 110, 112, 114, 116 and 120 described in FIG. 1 may be implemented as, but not limited to, a software module including program instructions and/or data structures in conjunction with hardware components such as a processor, a memory, interface, etc.; a hardware module including electronic circuitry; or a combination thereof. These modules 110, 112, 114, 116 and 120 described in FIG. 1 may be implemented on a single computer device such as a personal computer and a server machine, or over a plurality of devices such as a computer cluster of the computer devices in a distributed manner.

In a particular embodiment, the modules 110, 112, 114, 116 and 120 described in FIG. 1 may be implemented on a computer system including one or more computing node, each of which may include a memory tangibly storing program instructions; one or more interfaces in communication with the storage layers 140, 150 and the network; a processor in communications with the memory and the one or more interfaces.

Now, referring to the series of FIGS. 2-5, it will be described a novel method for managing a physical location of a file and providing a control of the physical location of the file in a hierarchical storage according to an exemplary embodiment of the present invention. Note that the method shown in the series of FIGS. 2-5, is performed by a computer system, which may have same configuration as the cloud storage system 100 shown in FIG. 1.

Figure 2:
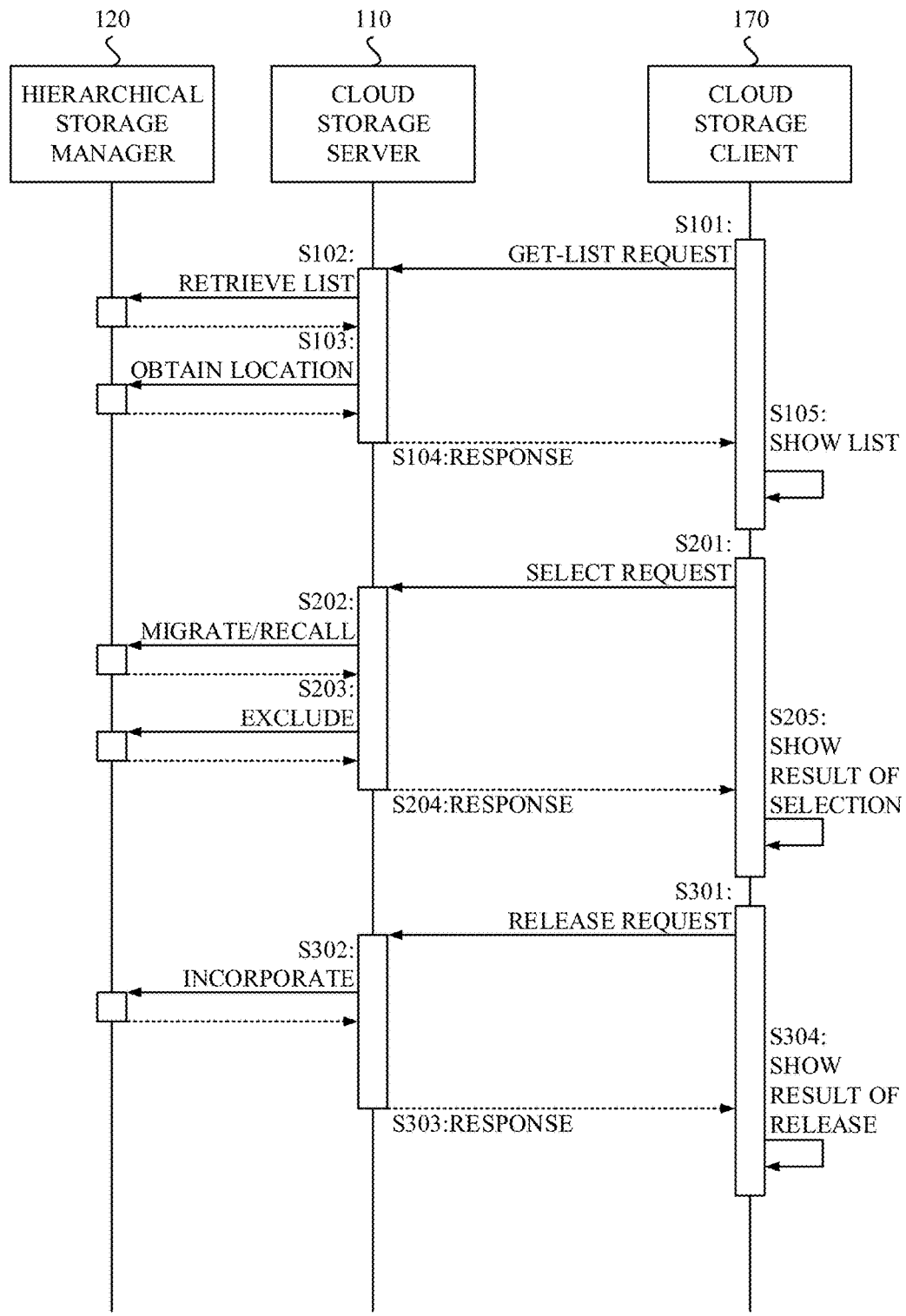
FIG. 2 is a sequence diagram depicting a process for managing a physical location of a file in a hierarchical storage according to an exemplary embodiment of the present invention.

FIG. 2 shows a sequence diagram depicting a process for managing a physical location of a file in a hierarchical storage. Note that the interaction shown in FIG. 2 may be performed by a processing unit of the cloud storage system 100 and a processing unit of the client device 160 shown in FIG. 1. The hierarchical storage 130 may include a disk storage layer 140 and a tape storage layer 150 as same as the embodiment shown in FIG. 1.

The process shown in FIG. 2 may begin at step S101. At step S101, the cloud storage client 170 may transmit a get-list request for viewing contents of a designated directory. The cloud storage server 110 may receive the get-list request from the cloud storage client 170.

At step S102, the cloud storage server 110 may retrieve a list of objects including subdirectories and files in the designated directory by inquiring the hierarchical storage manager 120. At step S103, the cloud storage server 110 may obtain physical locations (the corresponding storage layers) for the objects in the list by inquiring the hierarchical storage manager 120.

At step S104, the cloud storage server 110 may respond to the get-list request so as to present the list of the objects with each corresponding storage layer to the cloud storage client 170. At step S105, the cloud storage client 170 may show the list of the objects with their corresponding storage layers on a screen of the cloud storage client 170.

FIG. 3A depicts an example of a graphical user interface that displays a list of objects in the designated directory. The graphical user interface may be provided by the cloud storage server 110 through a communication via the network. As shown in FIG. 3A, the objects are listed and each corresponding storage layer for each object are graphically expressed by using an indent of file name and a position of the icon.

In FIG. 3A, an arrow denoted by "L" may represent that a file or a subdirectory positioned at the position indicated by the arrow (hereinafter, this position will be referred to as a first indent position) is being physically stored on the disk storage layer 140. On the other hand, an arrow denoted by "R" may represent that a file or a subdirectory positioned at the position indicated by the arrow (hereinafter, this position will be referred to as a second indent position) is being physically stored on the tape storage layer 150.

In one or more embodiments, end users may be guided that the indent position of the object means the physical location of the object, that may reflect to charge (e.g. disk storage layer with higher charge/tape storage layer with lower charge). Alternatively, in other embodiment, the end user may be guided that the indent position means service level provided for the object, that may reflect to charge (e g, minimum latency with higher charge/certain latency in allowable level on the agreement with lower charge). In any embodiments, the physical location of the object may be substantially controlled by the end user.

In the example shown in FIG. 3A, the corresponding storage layer for the object is expressed by using the indent of the file name and the position of the icon. However, way of expression may not be limited to the specific example shown in FIG. 3A. In one or more embodiments, the graphical user interface may be configured to express the corresponding storage layer using an indent, a color, a size, a font and/or emphasis of a text such as name, size, and last update timestamp; position; color and/or picture of a pictogram; and/or a text indicating the corresponding storage layer for the object that is added as an item in the list likely to name, size and last update timestamp.

The graphical user interface shown in FIG. 3A may be further configured to invoke a request for selecting one storage layer for an object in response to an event occurred at the view of the objects. The event may be triggered by a user gesture operation such as dragging, swiping or flicking of a graphical object (a text and/or a pictogram) in a predetermined manner.

An example of such user gesture operation is shown in FIG. 3B. Referring to FIG. 3B, a user gesture operation to select a physical location of a selected object is illustrated. As shown in FIG. 3B, when user flicks the graphical object representing a certain file that is positioned at the first indent position (L) from left to right on the screen, a request for selecting the tape storage layer 150 for the file may be invoked. When user flicks the graphical object of a certain file that is positioned at the second indent position (R) from right to left, a request for selecting the disk storage layer 140 for the file may be invoked.

In the example shown in FIG. 3B, the flicking from side to side is shown as an example of the user gesture operation. However, the user gesture operation may not be limited to the specific example shown in FIG. 3B. The flicking up and down may be other example of the user gesture operation. The graphical user interface may be configured to invoke the request of the selection in response to any kind of user operations including dragging, swiping or flicking of a text and/or a pictogram representing the selected object. The user operation may even include interactive operations using a menu such as popup menu and a dialog box.

Referring back to FIG. 2, at step S201, the cloud storage client 170 may transmit a select request for selecting one storage layer for a selected object. The cloud storage server 110 may receive the select request from the cloud storage client 170.

At step S202, the cloud storage server 110 may migrate or recall the selected object to one storage layer from other storage layer by requesting the hierarchical storage manager 120. At step S203, the cloud storage server 110 may exclude the selected object from the targets of the space management by requesting the hierarchical storage manager 120.

At step S204, the cloud storage server 110 may respond to the select request to notify a corresponding storage layer newly storing the selected object as a result of the selection to the cloud storage client 170. At step S205, the cloud storage client 170 may show the result of the selection on the screen of the cloud storage client 170.

Figure 4:
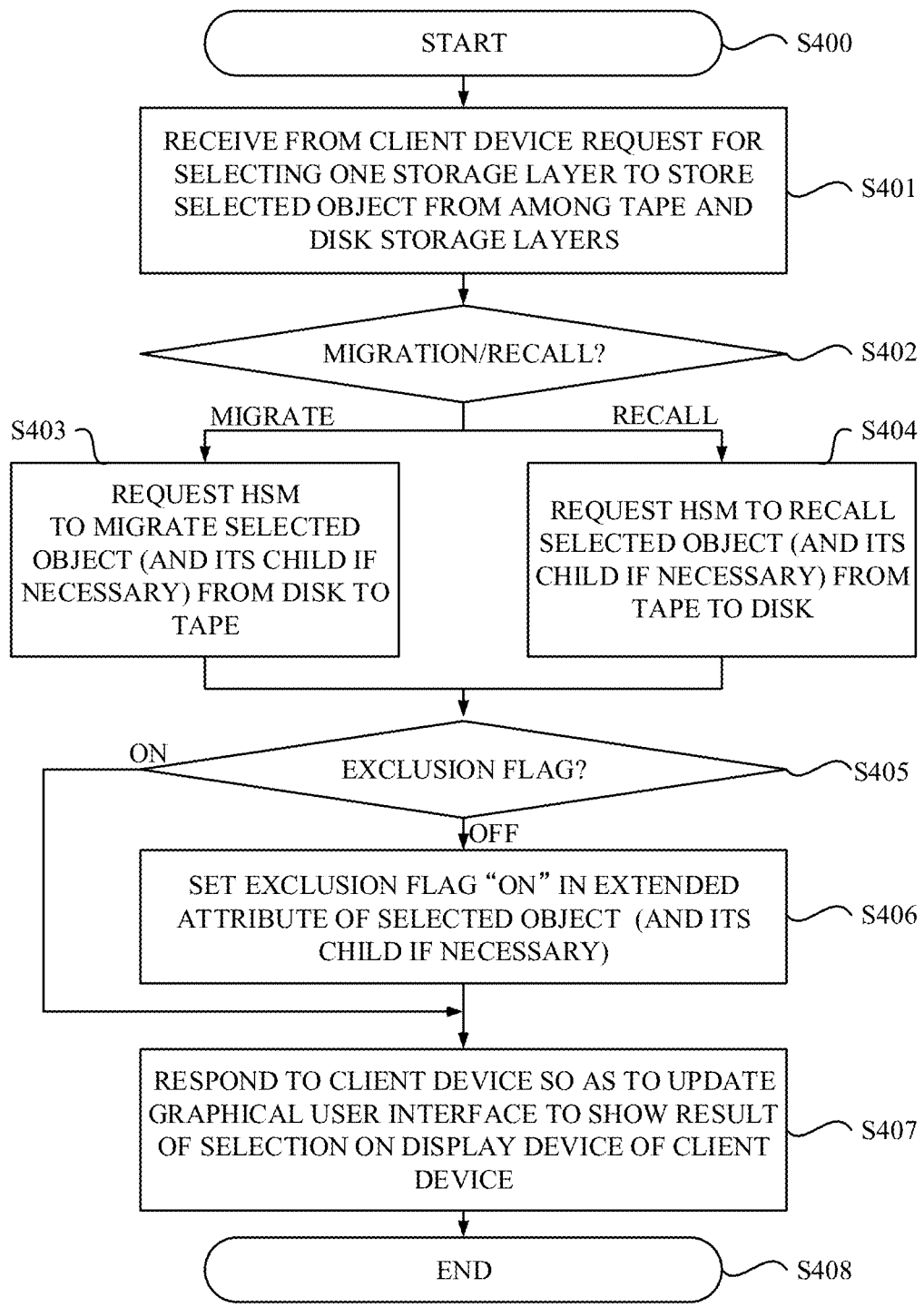
FIG. 4 is a flowchart depicting a process for selecting the physical location of the selected object from among tape and disk storage layers according to the exemplary embodiment of the present invention.

Referring to FIG. 4, there is shown a flowchart depicting a process for selecting the physical location of the selected object from among the tape and disk storage layers 140, 150. The process shown in FIG. 4 is detail of the process at steps S201-204 shown in FIG. 2. The processing from step S301 to step 304 shown in FIG. 2 will be described later. Note that the process shown in FIG. 4 may be performed by a processing unit that implements the cloud storage server 110.

The process shown in FIG. 4 may begin at step S400. At step S401, the cloud storage server 110 may receive from the client device 160 the select request for selecting one storage layer to store a selected object from among the tape and disk storage layers 140, 150. At step 402, the cloud storage server 110 may determine whether an operation required is migration or recall based on the request.

If the selection specifies the tape as the physical location for storing the selected object in step S402, the process may branch to step S403 (MIGRATE). At step S403, the cloud storage server 110 may request to the hierarchical storage manager 120 to migrate the selected object from the disk storage layer 140 to the tape storage layer 150. The selected object on the disk storage layer 140 may be deleted. Thus, the file state may become "migrated". Note that if the file state is already "pre-migrated", in which the object is on both the disk and tape storage layers 140, 150, the cloud storage server 110 may request to the hierarchical storage manager 120 to simply delete the object on the disk 142. If the selected object is a directory, one or more child objects under the selected directory, which may include files and subdirectory of the selected directory, may also be targets for the migration.

On the other hand, if the selection specifies the disk as the physical location for storing the selected object in step S402, the process may branch to step S404 (RECALL). At step S404, the cloud storage server 110 may request to the hierarchical storage manager 120 to recall the selected object from the tape storage layer 150 to the disk storage layer 140. The selected object on the tape storage layer 150 may not be or may be deleted. Thus, the file state may become "pre-migrated" or "resident". If the selected object is a directory, one or more child objects under the selected directory may also be targets for the recall.

At step 405, the cloud storage server 110 may determine whether the exclusion flag is "ON" or "OFF" by referring a predetermined extended attribute of the selected object. If the cloud storage server 110 determines that the exclusion flag is "OFF" in the step S405 (OFF), the process may branch to step S406.

At step S406, the cloud storage server 110 may request to the hierarchical storage manager 120 to set the exclusion flag "ON" in the extended attribute of the selected object so as to exclude the selected object from the targets of the space management. If the selected object is a directory, the exclusion flags of one or more child objects under the selected object may also be set "ON". If the cloud storage server 110 determines that the exclusion flag already has been "ON" in step S405 (ON), the process may branch to step S407 directly.

When the physical location of the selected object is explicitly selected, the physical location of the selected object is fixed and the file would not be migrated or recalled owing to the space management even if the selected object matches the predetermined policy.

At step S407, the cloud storage server 110 may respond to the client device 160 so as to update the graphical user interface to notify a corresponding storage layer newly storing the selected object as a result of the selection and end the process at step S408. Upon receiving the notification, the cloud storage client 170 may show the result of the selection on the display device of the client device 160.

Referring to FIG. 5A, there is shown change in the graphical user interface as a result of the selection for the selected object. As shown in FIG. 5A, change of the corresponding storage layer for the selected object may be reflected to the graphical user interface. In comparison with FIG. 3, the file that is positioned at the first indent position (L) and flicked from left to right by the user may be positioned at the second indent position (R) in FIG. 5A, which means the physical location of the file changes from the disk to the tape.

The graphical user interface shown in FIG. 5A may be further configured to invoke a release request for releasing the selection in response to an event occurred at the view of the objects shown in FIG. 5A. The event may be triggered by a user gesture operation such as dragging, swiping or flicking of a graphical object (a text and/or a pictogram) representing the object in a predetermined manner.

An example of such user gesture operation is shown in FIG. 5B. Referring to FIG. 5B, a user gesture operation to release the selection of the physical location for the selected object is illustrated. As shown in FIG. 5B, when user flicks the graphical object of a certain file, that is positioned at the second indent position (R), outwardly (further from left to right where there is no more storage layer) on the screen, the request for releasing the selection for the file may be invoked.

In the example shown in FIG. 5B, the flicking is shown as an example of the user gesture operation. However, the user gesture operation may not be limited to the specific example shown in FIG. 5B. The graphical user interface may be configured to invoke the request of the selection in response to any kind of user operations as mentioned above in a predetermined manner, which may be different from that of the selection.

Referring back to FIG. 2, at step S301, the cloud storage client 170 may transmit a release request for releasing the selection for a selected object and the cloud storage server 110 may receive the release request from the cloud storage client 170.

At step S302, the cloud storage server 110 may incorporate the selected object into the targets of the space management again by requesting the hierarchical storage manager 120. The cloud storage server 110 may request to the hierarchical storage manager 120 to set the exclusion flag "OFF" in the extended attribute of the selected object. If the selected object is a directory, the exclusion flags of one or more child objects under the selected object may also be set "OFF".

At step S303, the cloud storage server 110 may respond to the release request to notify a result of the release to the cloud storage client 170. At step S304, the cloud storage client 170 may show the result of the release on the screen of the cloud storage client 170.

When the selection for the file is explicitly released by the user, the file would be moved by the space management at appropriate timing if the file matches the predetermined policy.

In a particular embodiment, objects incorporated into the targets of the space management may be configured to be distinguished visually from objects that are excluded from the targets by using an indent, a color, a size, a font and/or emphasis of a text; position, color and/or picture of a pictogram; and/or a text added as an item in the list likely to name, size and last update timestamp. For example, a third indent position for representing a file or a subdirectory that is being incorporated into the targets of the space management can be arranged. For example, an additional mark or text can be added for indicating a file or a subdirectory that is being incorporated into the targets of the space management.

According to the aforementioned embodiments, there can be provided methods and computer systems 100 for managing a physical location of an object in the hierarchical storage 130 and/or providing a control of the physical location of the object in the hierarchical storage 130 to the client device 160.

By using the cloud storage system 100 according to one or more embodiments of the present invention for providing the cloud storage service, the cloud service providers can provide their services economically while keeping a certain level of service performance to satisfy user's demanded on each object (file or a director) under a certain limited resources.

With regard to the end users, each end user can individually control physical location of user's data or service level for each user's data. If usage is measured for each different storage layer and the charge is calculated based on the usage for each storage layer, a charge billed by the cloud storage service provider to the end user would be reduced.

Furthermore, the end user may be released from necessity to select single service at beginning of service usage by considering desired access performance and rate. Such necessity may lead a situation where the user would be forced to select high rate performance service even if the user requires high performance in a limited period. Such necessity may also lead a situation where the user would be forced to change a service that matches to user's current demand for each time the user's demand changes. In this situation, access method may be changed and additional data transfer charge for changing environment may be required since the service changes.

Detail of Cloud Environment Implementation

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
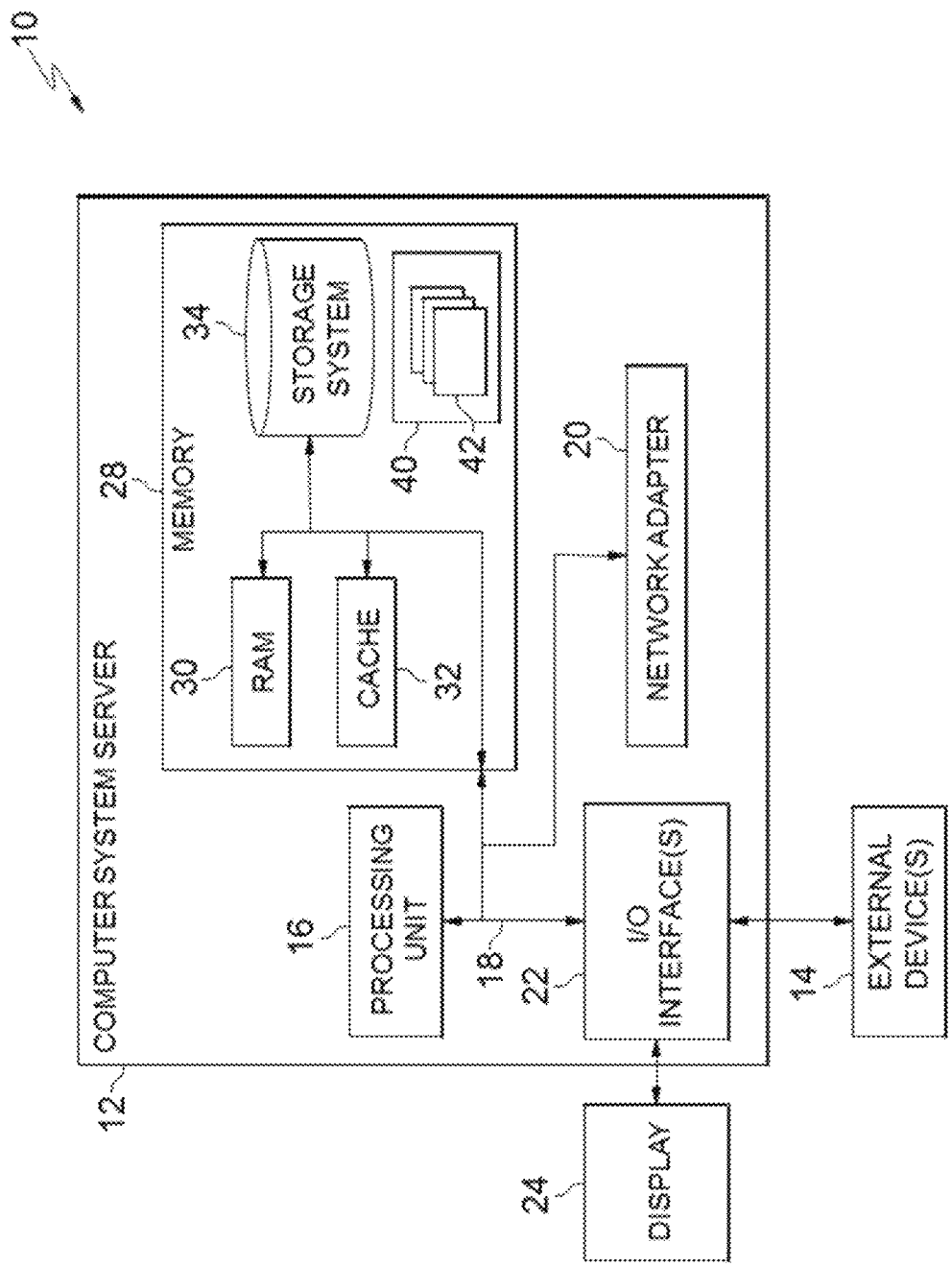
FIG. 6 depicts a cloud computing node according to an embodiment of the present invention.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
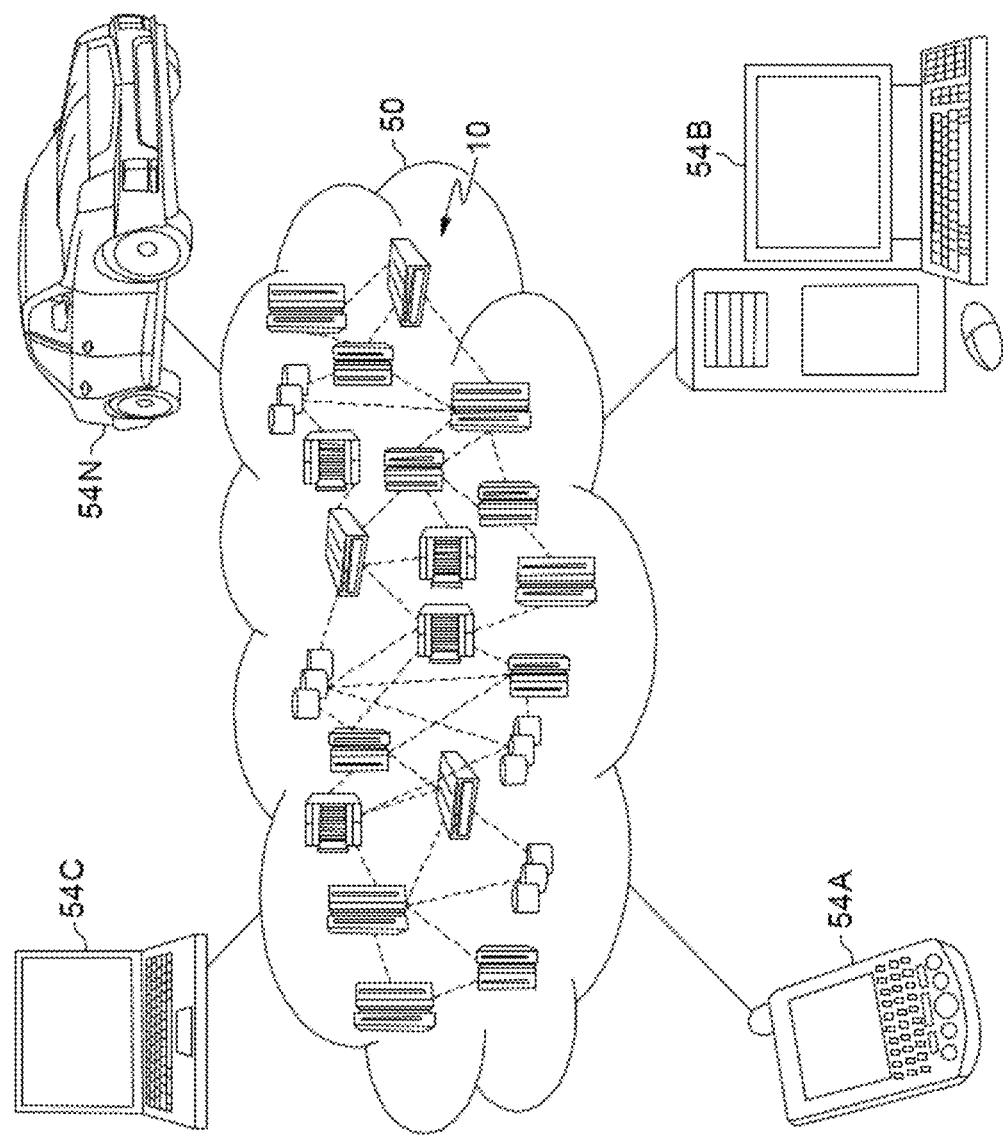
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
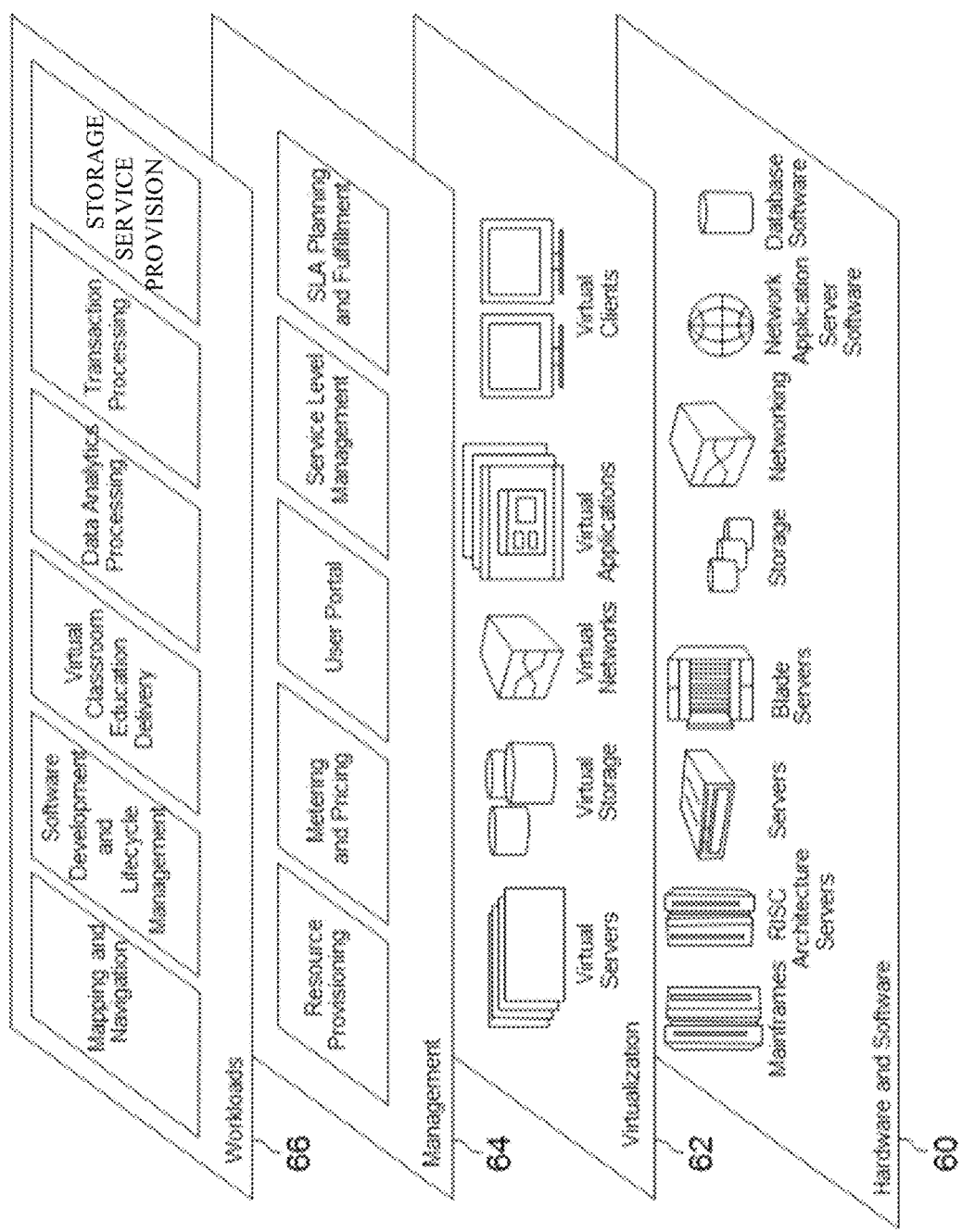
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices such as disk drive, tape drive and flash drive, etc.; networks and networking components. In some embodiments, software components include network application server software, hierarchical storage management software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. In a particular embodiment, these resources may include usage of each storage layer. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and storage service provision functionality.

In particular embodiments, there is provided a computer program product or software that implements the storage service provision functionality in accordance with embodiments described herein, as a service in a cloud environment. In this particular embodiment, any steps of the above-mentioned novel process for managing or providing a control of a physical location of a file in a hierarchical storage may be performed in the cloud computing environment. The storage service provision functionality may be implemented as a software module including program instructions and/or data structures in conjunction with hardware components provided by hardware and software 60.

Computer Program Implementation

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method performed by a computer system for managing a location of an object in a hierarchical storage, the hierarchical storage including a plurality of storage layers, the method comprising:
   receiving, via a network connected to the computer system, a selection of one storage layer for storing a selected object from among the plurality of the storage layers;
   moving the selected object to the selected one storage layer from another storage layer currently storing the selected object among the plurality of the storage layers; and
   excluding the selected object from targets of a predetermined space management applied to objects in the hierarchical storage until a specific request to release the selection of the one storage layer for the selected object is received.

2. The method of claim 1, wherein the excluding comprises:
   setting a specific value in an extended attribute of the selected object, the specific value indicating that the selected object is excluded from the targets of the predetermined space management by a user, the specific value remaining in the extended attribute of the selected object until the release is received.

3. The method of claim 2, comprising performing the predetermined space management on other objects while the selected object is excluded, wherein the predetermined space management includes automatic migration and recall activities of the other objects among the plurality of the storage layers based on a predetermined policy, the predetermined policy including a condition for the specific value in an extended attribute of each object; and receiving a release request from a user via a terminal device in communication with the computer system via the network.

4. The method of claim 1, wherein the method comprises:
   prior to the receiving, presenting a list of one or more objects with each corresponding storage layer storing each object to a terminal device in communication with the computer system via the network, each corresponding storage layer for each object being graphically expressed on a display device of the terminal device; and
   receiving a selection of the selected object, the selection of the selected object and the one storage layer originating from user input to the terminal device.

5. The method of claim 4, wherein the presenting comprises:
   providing a graphical user interface to the terminal device through a communication via the network, the graphical user interface being configured to express each corresponding storage layer for each object using at least one visual indication selected from the group consisting of: an indent, a color of a text, a size of a text, a font emphasis of a text, position of a pictogram, color of a pictogram, picture of a pictogram, and a text indicating the corresponding storage layer for the object in a view of the one or more objects.

6. The method of claim 5, wherein the presenting comprises:
   providing a graphical user interface to the terminal device through a communication via the network, the graphical user interface being configured to invoke a request of the selection in response to a user operation to a view of the one or more objects via an input device of the terminal device.

7. The method of claim 6, wherein the user operation is an operation selected from the group consisting of: dragging of a text in a predetermined manner, swiping of a text in a predetermined manner, flicking of a text in a predetermined manner, dragging of a pictogram in a predetermined manner, swiping of a pictogram in a predetermined manner, and flicking of a pictogram in a predetermined manner; the text, the pictogram, or the text and pictogram representing the selected object.

8. The method of claim 1, wherein the method further comprises:
   posterior to the moving, notifying a corresponding storage layer newly storing the selected object as a result of the selection to a terminal device in communication with the computer system via the network; and
   in response to receiving a release request for the selection from the terminal device, incorporating the selected object into the targets of the predetermined space management again.

9. The method of claim 8, wherein the notifying comprises:
   providing a graphical user interface to the terminal device through a communication via the network, the graphical user interface being configured to invoke the release request in response to a user operation via an input device of the terminal device.

10. The method of claim 9, wherein the user operation is at least one operation selected from the group consisting of: dragging of a text in a predetermined manner, swiping of a text in a predetermined manner, flicking of a text in a predetermined manner, dragging of a pictogram in a predetermined manner, swiping of a pictogram in a predetermined manner, and flicking of a pictogram in a predetermined manner; the text, the pictogram, or the text and pictogram representing the selected object.

11. The method of claim 1, wherein each object is a file or directory, the location of the object is a physical location and the plurality of the storage layers includes at least a tape storage layer and a disk or flash storage layer.

12. The method of claim 1, wherein the method is performed in a cloud computing environment.

13. A computer system for managing a location of an object in a hierarchical storage including a plurality of storage layers, the computer system comprising:
   a memory storing program instructions;
   one or more interfaces in communication with the plurality of the storage layers and a network; and
   a processor in communications with the memory and the one or more interfaces, wherein, by executing the program instructions, the processor is configured to:
   send a list of objects in the hierarchical storage to a terminal device via a network;
   receive a user-specified selection of one storage layer for storing a selected object from among the plurality of the storage layers via the network;
   move the selected object to the selected one storage layer from another storage layer currently storing the selected object among the plurality of the storage layers; and
   exclude the selected object from targets of a predetermined space management applied to objects in the hierarchical storage until a specific request to release the selection of the one storage layer for the selected object is received from a user via the terminal device and network;
   perform the predetermined space management on other objects while the selected object is excluded;
   after performing the predetermined space management on the other objects while excluding the selected object, receiving a release request for the selection from the terminal device;
   in response to receiving the release request for the selection from the terminal device, incorporating the selected object into the targets of the predetermined space management again; and
   in response to incorporating the selected object into the targets of the predetermined space management again, moving the object according to a policy of the predetermined space management.

14. The computer system of claim 13, wherein the processor is further configured to:
   set a specific value in an extended attribute of the selected object in order to exclude the selected object, the specific value indicating that the selected object is excluded from the targets of the predetermined space management by a user.

15. The computer system of claim 13, wherein the processor is further configured to:
   present a list of one or more objects with each corresponding storage layer storing each object to a terminal device in communication with the computer system via the network prior to receiving the selection, each corresponding storage layer for each object being graphically expressed on a display device of the terminal device.

16. The computer system of claim 13, wherein the processor is further configured to:
   notify a corresponding storage layer newly storing the selected object as a result of the selection to a terminal device in communication with the computer system via the network posterior to moving the selected object; and
   incorporate the selected object into the targets of the predetermined space management again in response to receiving a release request for the selection from the terminal device.

17. A computer program product for managing a location of an object in a hierarchical storage, the hierarchical storage including a plurality of storage layers, the computer program product comprising a computer readable storage medium having program instructions embodied therewith, the program instructions executable by a computer to cause the computer to perform a method comprising:
   sending a list of objects in the hierarchical storage to a terminal device in communication with the computer via a network connected to the computer;
   receiving, from the terminal device via the network, selection of an object from the list of objects by a user at the terminal device;
   receiving a selection, by the user, of one storage layer for storing a selected object from among the plurality of the storage layers;
   moving the selected object to the selected one storage layer from another storage layer currently storing the selected object among the plurality of the storage layers; and
   excluding the selected object from targets of a predetermined space management applied to objects in the hierarchical storage in response to receiving the selection by the user of the one storage layer until a specific request to release the selection of the one storage layer for the selected object is received.

18. A method performed by a computer system for providing control of a location of an object in a hierarchical storage to a terminal device via a network, the hierarchical storage including a plurality of storage layers, the method comprising:
   providing a graphical user interface to the terminal device through a communication via the network, the graphical user interface being configured to invoke a selection, by a user, of one storage layer for storing a selected object from among the plurality of the storage layers in response to an event on the terminal device;
   in response to the selection, moving the selected object to the selected one storage layer from another storage layer currently storing the selected object among the plurality of the storage layers;
   in response to the selection, excluding the selected object from targets of a predetermined space management applied to all objects in the hierarchical storage except objects explicitly excluded therefrom until a request to specifically release the selection of the one storage layer for the selected object is received from the terminal device; and
   reflecting change of a corresponding storage layer storing the selected object in the graphical user interface as a result of the selection through a communication via the network; and
   outputting, in the graphical user interface, a result of a user request to release the selection of the one storage layer for the selected object in response to receiving a user request to release the selection.

19. The method of claim 18, comprising: incorporating the selected object into the targets of the predetermined space management at a later time in response to receiving the release request for the selection from the terminal device; and showing a result of the release in the graphical user interface through a communication via the network in response to incorporating the release.

20. The method of claim 18, wherein the graphical user interface is configured to express each corresponding storage layer for each object using at least one visual indication selected from the group consisting of: an indent of a text, a color of a text, a size of a text, a font of a text, emphasis of a text, position of a pictogram, color of a pictogram, picture of a pictogram, and a text indicating the corresponding storage layer for the object in a view of one or more objects.

* * * * *